(12) United States Patent
Thubert et al.

(10) Patent No.: US 8,341,279 B2
(45) Date of Patent: Dec. 25, 2012

(54) DYNAMICALLY ACTIVATING BUFFERED DATA PUBLISHERS IN SENSOR NETWORKS

(75) Inventors: Pascal Thubert, La Colle sur Loup (FR); Jean-Philippe Vasseur, Saint Martin d'Uriage (FR); Patrick Wetterwald, Mouans Sartoux (FR); Vincent Jean Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 293 days.

(21) Appl. No.: 12/272,453

(22) Filed: Nov. 17, 2008

(65) Prior Publication Data

US 2010/0125671 A1    May 20, 2010

(51) Int. Cl.
 *G06F 15/16* (2006.01)
(52) U.S. Cl. .............. 709/230; 710/22; 710/41; 710/56; 455/78; 455/509
(58) Field of Classification Search .................. 709/230; 710/41, 56, 22; 455/78, 509
See application file for complete search history.

(56) References Cited

U.S. PATENT DOCUMENTS

| | | | |
|---|---|---|---|
| 6,904,286 B1 | 6/2005 | Dantu | |
| 7,061,860 B1 | 6/2006 | Calvignac et al. | |
| 7,171,491 B1 | 1/2007 | O'Toole et al. | |
| 7,260,692 B1* | 8/2007 | Zahavi et al. | 711/154 |
| 7,305,069 B1 | 12/2007 | Day | |
| 2004/0048630 A1* | 3/2004 | Shapira | 455/509 |
| 2004/0192222 A1* | 9/2004 | Vaisanen et al. | 455/78 |
| 2004/0221052 A1* | 11/2004 | Ramasubramanian et al. | 709/230 |
| 2007/0113284 A1 | 5/2007 | O'Rourke et al. | |
| 2007/0121673 A1 | 5/2007 | Hammer | |
| 2007/0159321 A1* | 7/2007 | Ogata et al. | 340/539.12 |
| 2007/0192451 A1 | 8/2007 | Tran et al. | |
| 2007/0206547 A1 | 9/2007 | Gong et al. | |
| 2008/0098055 A1* | 4/2008 | Yamaguchi et al. | 708/200 |
| 2009/0015478 A1* | 1/2009 | Li et al. | 342/377 |
| 2009/0083480 A1* | 3/2009 | Moritoki et al. | 711/112 |

* cited by examiner

Primary Examiner — Thuong Nguyen
(74) Attorney, Agent, or Firm — Cesari and McKenna, LLP

(57) ABSTRACT

In one embodiment, a node in a computer network may receive data of a particular type at a first frequency (e.g., a sensor in a sensor network), and may correspondingly determine whether there is at least one interested subscriber for the data of the particular type, where the interested subscriber desires the data at a second frequency. If there is an interested subscriber, buffered data publishing may be dynamically activated at the node in response to a ratio between the second and first frequencies being less than a configured threshold. In particular, buffered data publishing comprises buffering the received data and transmitting a latest received data to the interested subscriber at the second frequency.

18 Claims, 7 Drawing Sheets

SUBSCRIBER LIST 300

| ID 305 | TYPE 310 | FREQUENCY 315 |
|---|---|---|
| S1 | TEMP | F2a |
| S2 | PRESSURE | F2b |
| ⋮ | ⋮ | ⋮ |
| SN | (TYPE) | (FREQ.) |

ENTRIES 320

FIG. 3

DYNAMICALLY ACTIVATING BUFFERED DATA PUBLISHERS IN SENSOR NETWORKS

TECHNICAL FIELD

The present disclosure relates generally to computer networks, and, more particularly, to sensor networks.

BACKGROUND

Sensor networks are commonly made of a very large number of nodes. One of the major issues in sensor networks is the amount of traffic that is forwarded between the sensors, thus resulting in congestion (bandwidth concerns) and the shortening of sensor longevity (e.g., battery exhaustion). For the sake of illustration, consider a network of fifty million sensors (e.g., smart meters) read by a central application. Each of the fifty million sensors is going to transmit its data over the network (e.g., a smart grid) to the central application, thus the amount of traffic sent becomes overwhelming, particularly as the data gets closer to the destination of the traffic (e.g., a "fan-in" problem).

BRIEF DESCRIPTION OF THE DRAWINGS

The advantages of the invention may be better understood by referring to the following description in conjunction with the accompanying drawings in which like reference numerals indicate identically or functionally similar elements, of which:

FIG. 3 illustrates an example subscriber list;

DESCRIPTION OF EXAMPLE EMBODIMENTS

Overview

Figure 1:
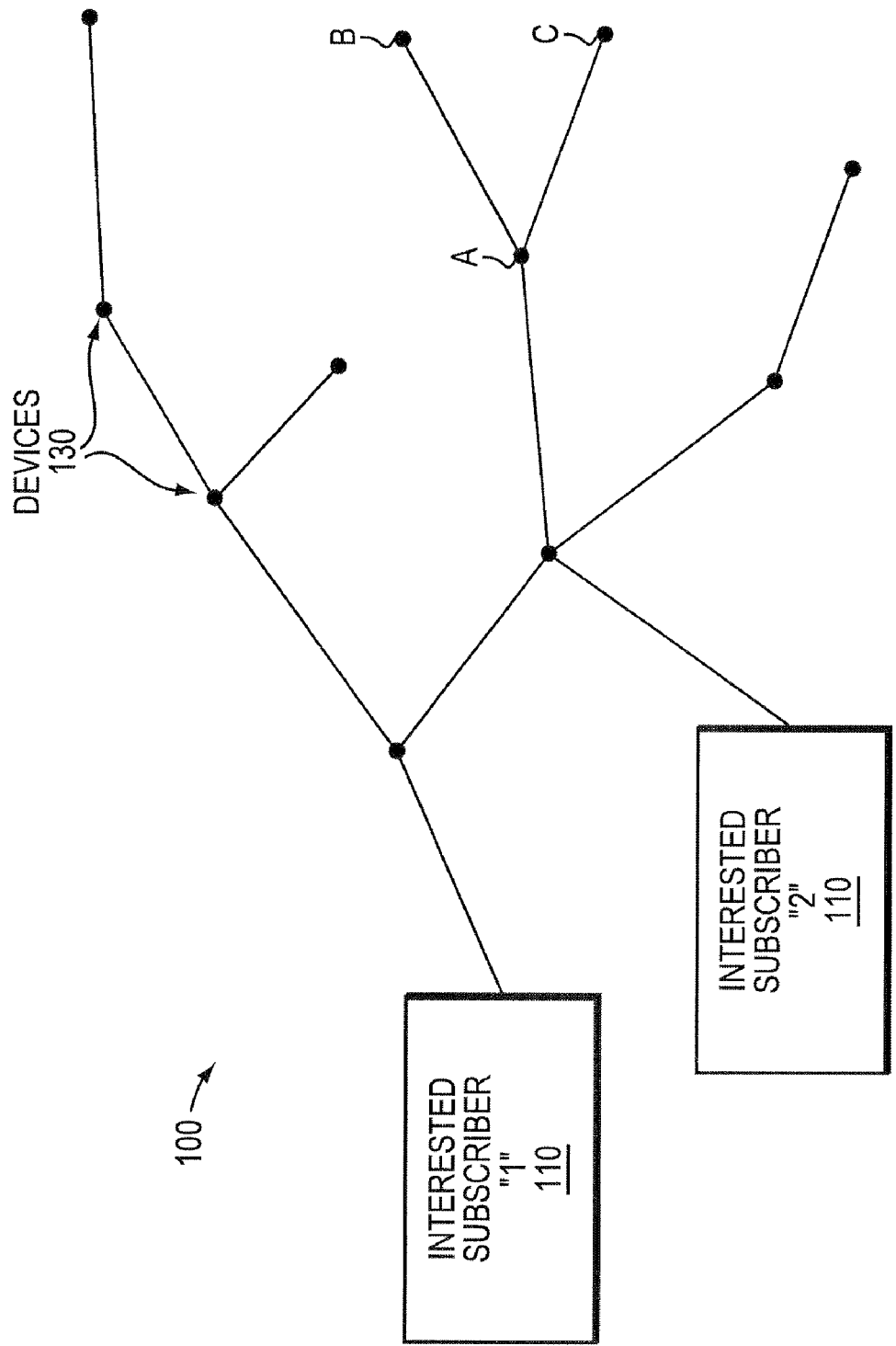
FIG. 1 illustrates an example computer/sensor network.

According to embodiments of the disclosure, a node in a computer network may receive data of a particular type at a first frequency (e.g., a sensor in a sensor network), and may correspondingly determine whether there is at least one interested subscriber for the data of the particular type, where the interested subscriber desires the data at a second frequency. If there is an interested subscriber, buffered data publishing may be dynamically activated at the node in response to a ratio between the second and first frequencies being less than a configured threshold. In particular, buffered data publishing comprises buffering the received data and transmitting a latest received data to the interested subscriber at the second frequency.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Sensor networks, in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Sensor networks are typically wireless networks, though wired connections are also available. That is, in addition to one or more sensors, each sensor device (node) in a sensor network may generally be equipped with a radio transceiver or other communication port, a small microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data to one or more centralized database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement, and transmit that result) to the sensor sink. Generally, in the subscriber-based model (as used herein and described below), pull mode is not used (since in pull mode, the polling device is simply referred to as a sensor sink).

FIG. 1 is a schematic block diagram of an example computer network, or, more particularly, a sensor network 100, illustratively comprising nodes/devices, such as one or more devices 130 (e.g., sensors) such as nodes A, B, C, etc., and one or more interested subscribers 110 (e.g., sensor sinks) such as nodes S1, S2, etc., interconnected by links (not generally shown for clarity). Those skilled in the art will understand that any number of nodes, devices, links, etc. may be used in the computer network, and that the view shown herein is for simplicity. The links (not shown) may be wired links for electronic and/or optical transmissions, or may comprise a wireless communication medium, as will be appreciated by those skilled in the art (such as for wireless ad-hoc networks), where certain nodes 130 may be in communication with other nodes 130, e.g., based on distance, signal strength, current operational status, location, etc., or in direct communication with the sensor sinks, such as interested subscribers 110.

Data packets (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, Multi-Protocol Label Switching (MPLS), various proprietary protocols, etc. In this context, a protocol consists of a set of rules defining how the nodes interact with each other.

Figure 2:
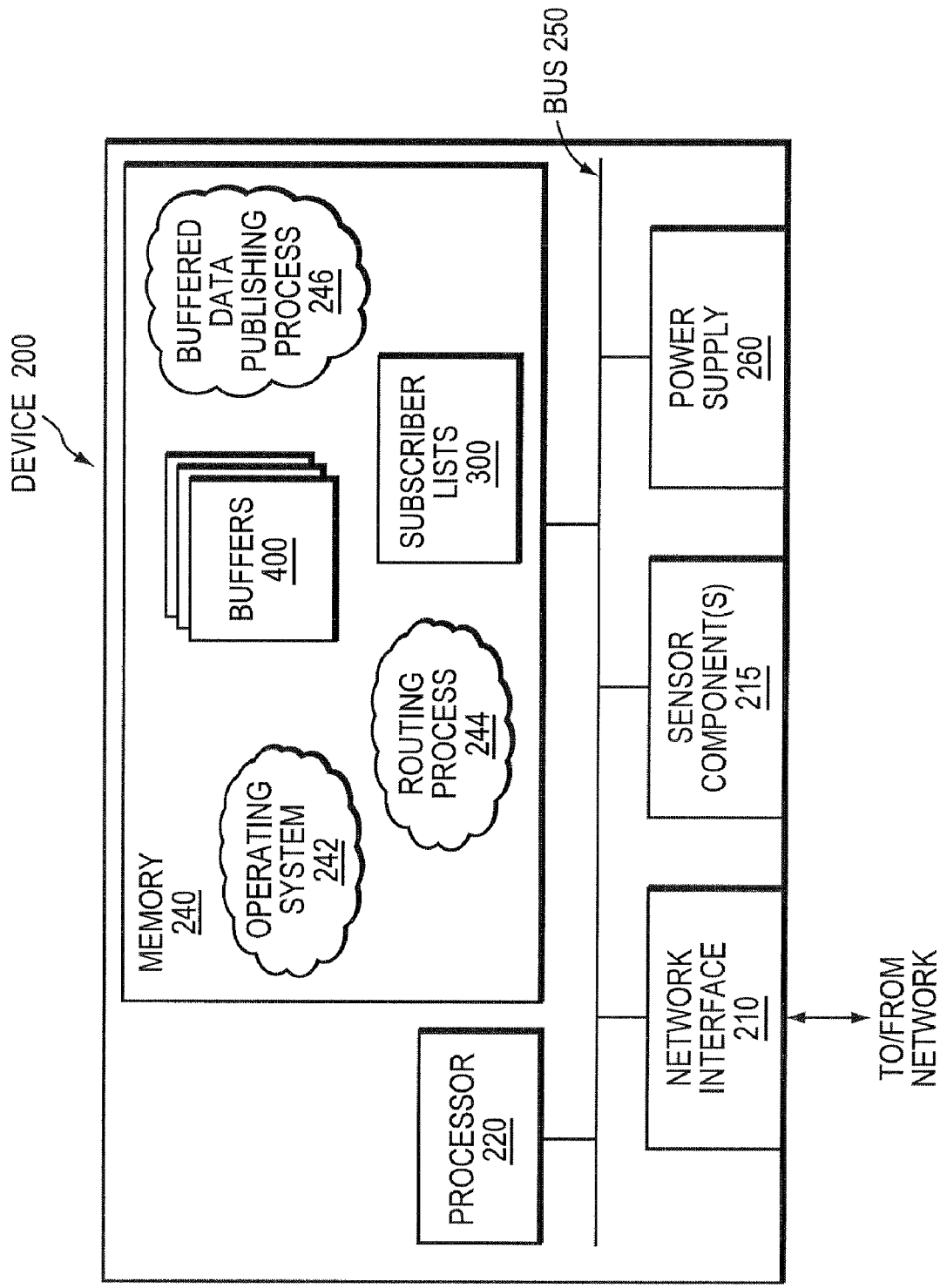
FIG. 2 illustrates an example device.

FIG. 2 is a schematic block diagram of an example node/device 200 that may be advantageously used with one or more embodiments described herein, e.g., as a device or sensor 130. The device comprises one or more network interfaces 210, one or more sensor components 215, a processor 220 (e.g., an 8-64 bit microcontroller), and a memory 240 interconnected by a system bus 250, as well as a power supply 260 (e.g., battery, plug-in, etc.). The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, ATM, wireless protocols (e.g., IEEE Std. 802.14.5, WiFi, Bluetooth®,), Frame Relay, Ethernet, powerline converter (PLC) protocols, etc.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures, such as subscriber lists 300 and buffers 400, described below. An operating system 242, portions of which are typically resident in memory 240 and executed by the processor, functionally organizes the device by, inter alia, invoking operations in support of software processes and/or services executing on the device. These software processes and/or services may comprise, as described herein, a routing process 244, and a buffered data publishing process 246. It will be apparent to those skilled in the art that other processor and memory types, including various computer-readable media, may be used to store and execute program instructions pertaining to the inventive techniques described herein.

Routing process (services) 244 contains computer executable instructions executed by the processor 220 to perform functions provided by one or more routing protocols, such as proactive or reactive routing protocols as will be understood by those skilled in the art. These functions may be configured to manage a routing table (not shown) containing, e.g., data used to make routing decisions. In particular, in proactive routing, connectivity is discovered and known prior to computing routes to any destination in the network (e.g., Optimized Link State Routing, "OLSR"). Reactive routing, on the other hand, discovers neighbors (i.e., does not have an a priori knowledge of network topology), and in response to a needed route to a destination, sends a route request into the network to determine which neighboring node may be used to reach the desired destination. Illustrative reactive routing protocols may comprise, inter alia, Ad-hoc On-demand Distance Vector (AODV), Dynamic Source Routing (DSR), DYnamic MANET On-demand Routing (DYMO), etc. Generally, reactive routing protocols may be used to reduce storage and processing requirements on the nodes 130 (e.g., small, distributed, low-power devices, such as sensors), and to limit the number of updates to stored topologies due to the ad-hoc changing nature of the network (e.g., MANETs). However, as used herein, either proactive or reactive routing protocols may be used as appropriate to the network 100.

As noted above, sensor networks are commonly made of a very large number of nodes, and a major concern in sensor networks is the amount of traffic that is forwarded between the sensors, thus resulting in congestion (bandwidth concerns) and the shortening of sensor longevity (e.g., battery exhaustion).

Buffered Data Publishing

According to embodiments of the disclosure, a modified "publish-subscribe" technique is used, where feeders (e.g., sensor devices 130) send data at their own frequency, and the data is stored in a database (e.g., at a publisher, which may, but need not, be the same device 130) to be sent to interested subscribers 110 at a potentially different rate.

In the traditional publish/subscribe model (e.g., voice), a server acts as an immediate multicaster, and each message received at the server is immediately transmitted (multicasted) to all subscribers. That is, the samples (e.g., voice data) must all be transmitted at the same rhythm (rate, frequency, period, etc.) and in the same order as they are generated, and none of the data should be overwritten (i.e., the data may be queued in a first-in-first-out or "FIFO" manner). Also, in certain sensor networks, sensor data may be buffered, such that a sensor obtains a reading at a given rate, and stores it in a local buffer to be "popped" by a network portion of the sensor at a different rate to send the data over the network. That is, the sensor may obtain a plurality of different readings that are stored in a buffer, but only the most recent data may be sent over the network when it is time to "pop" the data.

As described herein, buffered data publishing techniques utilize a publish-subscribe model, and modifies it to adapt to the "buffered" data model. That is, with the buffered data publishing model as described herein, a server (publisher) buffers the data, eventually overriding stale data by new data, and only passes the data to an interested subscriber based on the subscriber's constraints, e.g., timely (at a rate desired by the subscriber). (Note that similar techniques comprise data aggregation, as may be appreciated by those skilled in the art.)

One non-trivial problem associated with buffered data publishing is determining where to place the buffers (or aggregators) within the network. In particular, current buffering and/or aggregating devices are manually placed in a network, e.g., "in the middle somewhere," without any attempt to optimize storage and data transmission. This may partly be due to the fact that the data flows within a network may change frequently, and as such, the manual placement of such devices is cumbersome and non-adaptive.

Dynamically Activated Buffered Data Publishing

According to one or more embodiments described herein, therefore, a solution is proposed that dynamically activates local storage processing on the nodes acting as publishers (buffered data publishers) that asynchronously redistribute the relevant data to an interested subscriber, i.e., dynamically determining *where* the publishers should be in the network.

Illustratively, the techniques described herein may be performed by hardware, software, and/or firmware, such as in accordance with a buffered data publishing process 246, which may contain computer executable instructions executed by the processor 220 to perform functions relating to the novel techniques described herein.

As mentioned above, a network 100 may comprise a plurality of nodes/devices 130 capable of generating and/or receiving data at a given rate or frequency ("F1"), such as sensors (e.g., generating their own data and receiving data from upstream nodes toward a destination). In addition, one or more interested subscribers 110 may also be present in the network. These interested subscribers may generally be defined as entities interested to receive a particular type of data (e.g., temperature, pressure, etc.) and at a particular frequency (i.e., how often the subscriber would like to receive the data, e.g., once per hour, day, etc.). This subscriber frequency ("F2") is often different or otherwise asynchronous to the data frequency F1.

According to the embodiments described herein, therefore, certain nodes 130 of the network may be configured to have the capability of being a buffered data publishing device/node (or "publisher"). For instance, while in certain networks, all nodes may be publisher capable nodes, other networks may configure a subset of the nodes/devices as publisher capable nodes. In either scenario, the techniques described herein detail how to dynamically activate each of the node's buffered data publishing features/functionality for a given data type based on the two frequencies, F1 and F2, to thus "locate" or "place" the buffered data publishers in the network 100 to store and transmit the data in an efficient manner.

Operationally, a node/device 130 may receive data of a particular type at a data frequency F1 from a variety of different sources. For example, in a sensor network, the data may be received from sensor component 215 of the device, such as the actual sensing mechanism. Alternatively or in addition, the data may be received from one or more upstream nodes (i.e., the receiving node is between the upstream nodes and the interested subscriber to which the data is being transmitted), also referred to as "children" of the receiving node.

Figure 3:
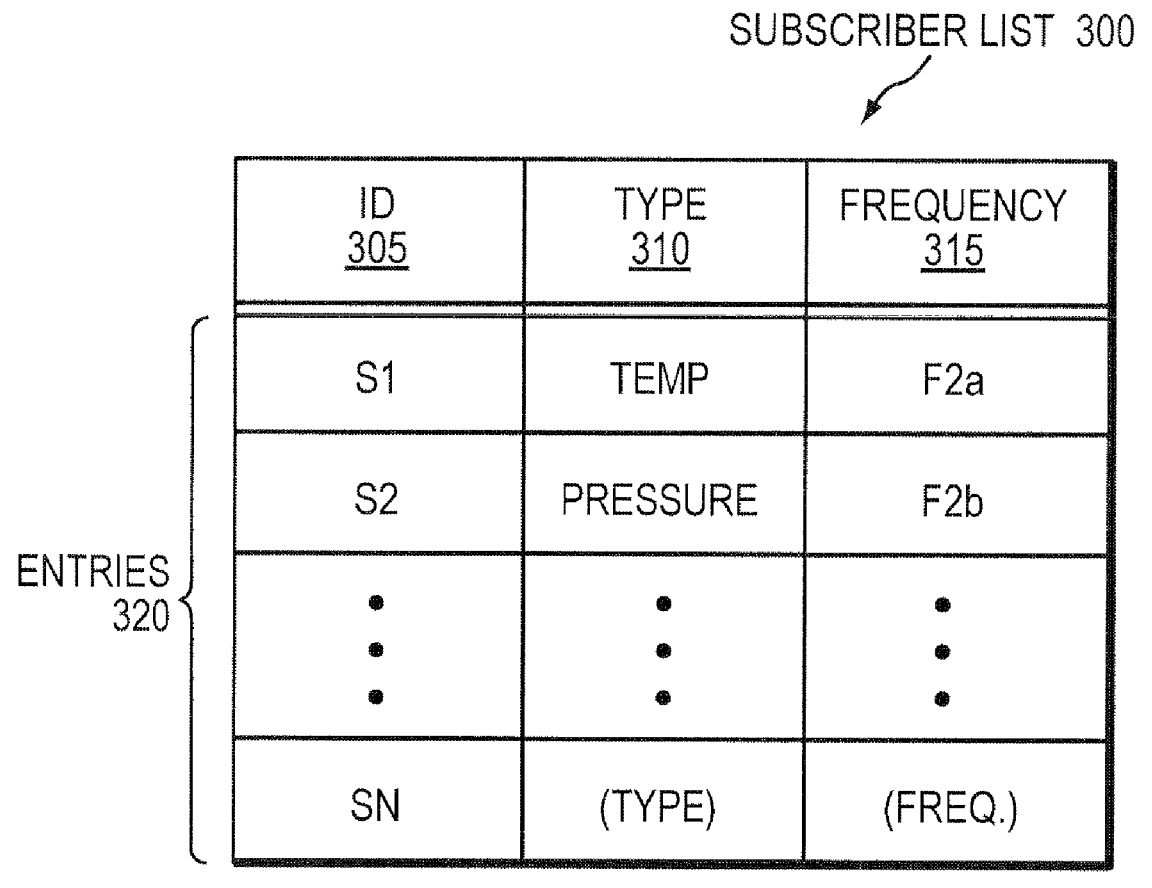

Once the data of a particular type is received, the device 130 may determine whether there is at least one interested subscriber 110 for that data. FIG. 3 illustrates an example subscriber list 300 that may be used by the device 130 to determine whether interested subscribers exist for the particular type of data. For instance, the list 300 may be made up of one or more entries 320, each having a plurality of fields comprising, inter alia, a subscriber identification (ID) field 305, a data type field 310, and a desired frequency field 315.

For example, assume that subscriber S1 has requested (e.g., using conventional techniques as will be appreciated by those skilled in the art) to receive temperature readings from nodes in the network at a frequency of "F2$a$", e.g., once per hour, and that subscriber S2 has requested to receive pressure readings from nodes in the network at a frequency of "F2$b$". If the received data is either a temperature or pressure, therefore, then there is at least one correspondingly interested subscriber in the data.

Upon detecting that there is at least one interested subscriber for particular data type, the receiving node may determine a ratio between the subscriber frequency and the data frequency, or F2/F1. If this ratio is less than a configured threshold ("Alpha", e.g., less than 1), then the buffered data publishing feature/functionality may be dynamically activated at the node for that data type and that interested subscriber. Note that all buffered data publishing capable nodes in the computer network 100 may (but need not) use the same rule and the same configured threshold (Alpha), such that the level of aggregation desired is dynamically achieved through each network device computing its role/functionality in the same manner, thus avoiding misconfigurations.

Specifically, the buffered data publishing function comprises storing the data received at rate F1 in a local database (e.g., buffer 400) where the data is buffered and locally updated, and then forwarding the data to the set of interested sources at their respective rate F2.

Figure 4:
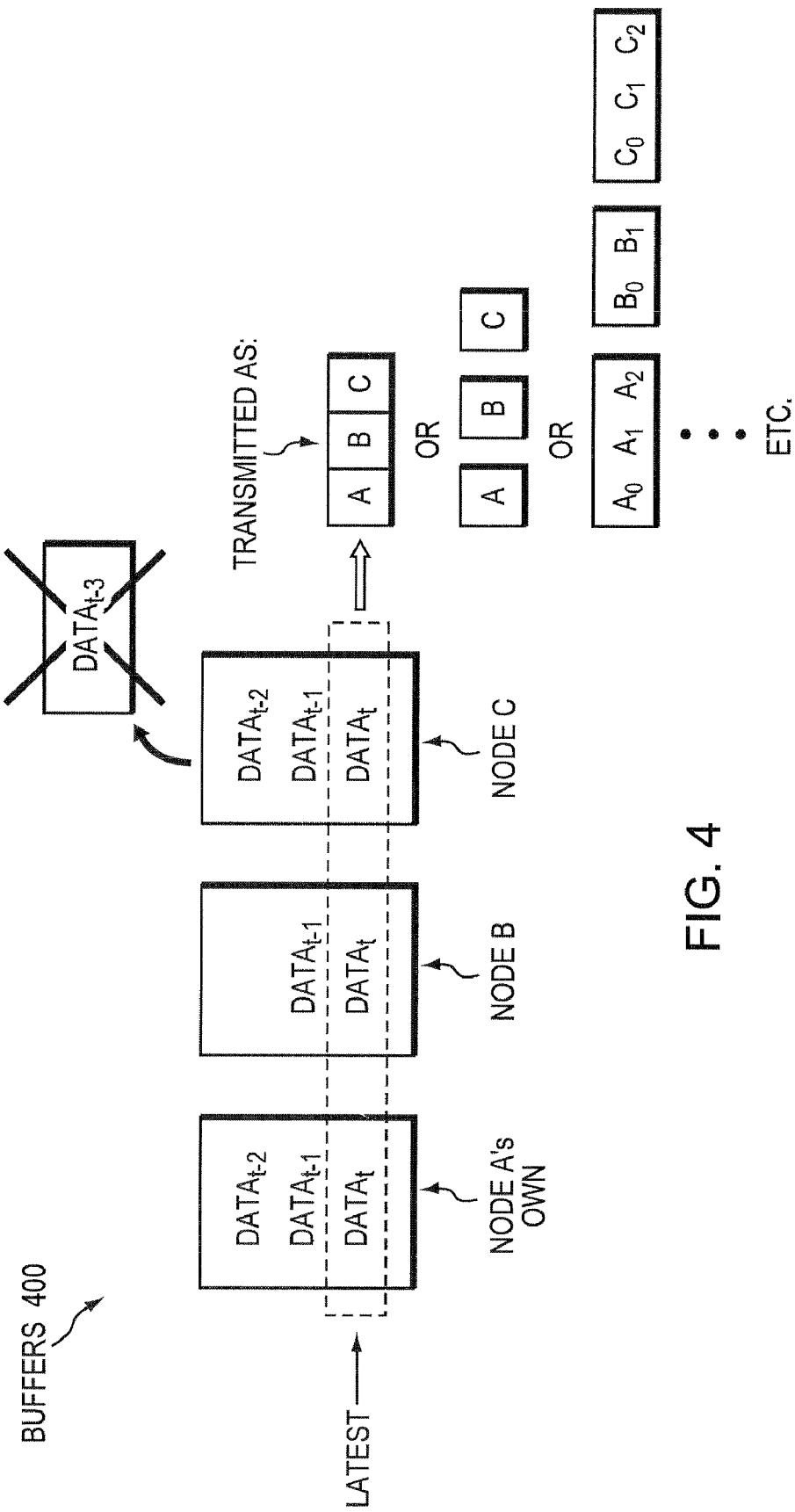
FIG. 4 illustrates an example buffer.

For instance, FIG. 4 illustrates an example buffer (database) 400 that may be advantageously used in accordance with one or more embodiments described herein. In particular, the buffered data may comprise data from the "receiving" node (e.g., node A), as well as data from other nodes (e.g., nodes B and C). Illustratively, the buffered data may be stored for a set number of periods, where the most recently received data "bumps" the oldest data out of the buffer (e.g., in a last-in-first-out, or "LIFO" manner). For example, assume that three data values are stored for each receiving origin (e.g., each node A, B, or C). As shown, node C has submitted four data points to node A, and as such, the first data point is removed from the buffer to make room for more recent data (a simplified example).

While operating as a buffered data publisher, the node may then transmit a "latest received data" from the buffer to the interested subscriber at the subscriber's desired frequency. (Note that transmitting data to the subscriber comprises unicasting the data to the interested subscriber, and not multicasting the data as is done in conventional publish-subscribe models.) According to one or more aspects of the embodiments described herein, the "latest received data" may take one of a variety of different forms, depending on configuration and/or local policy. For instance, in one straightforward model, the latest received data is simply the last data point received from a particular source, e.g., the last data from node A, node B, and node C. Alternatively, when transmitting the data at the desired rate to the subscriber, it may be beneficial (e.g., requested by the subscriber) that all buffered data since a previous transmission be sent to the subscriber (e.g., anything in the buffer 400 not already sent to the interested subscriber). In this manner, the subscriber still obtains all of the data (assuming a large enough buffer), but only at certain desired times. (Note that message aggregation may further alleviate the congestion of the network with large amounts of data points being transmitted; that is, multiple data points from multiple sources may be included in a single message and appropriately labeled, as will be understood by those skilled in the art.)

As another example, the "latest received data" may comprise a configurable length rolling average of the buffered data. In other words, assume that the data type is a temperature, and the buffer stores ten entries per source. As such, the latest received data may be a computed average of all of the temperature values in the buffer (or fewer of the most recent values, depending on configuration), and that value may be sent (e.g., as an alternative to the most recent value, or in addition to the most recent value). For instance, the buffered transmitted data may comprise the most recent data (e.g., 21 degrees C.) and the average of the last few data entries (e.g., 22 degrees C.) to quickly inform the interested subscriber of rough data measurements in the interim between published data is received. (Those skilled in the art will appreciate that the examples given herein are merely representative of a larger set of "latest received data" configurations, and are not meant to limit the scope of the embodiments herein.)

In the event, however, that it is determined that there are no interested subscribers for a type of data received at the device 130 (e.g., radiation, not found in a type field 310 of any entry 320), then the device may simply decide to drop the data packets, e.g., based on local policy. Also, where the ratio between the subscriber frequency and the data frequency (F2/F1) is not less than the configured threshold (Alpha), then the buffered data publishing functionality need not be activated, and the received data may simply be transmitted to the interested subscriber(s) at the data frequency. For example, if the interested subscriber desires the data at a greater or equal rate than the data rate, or a rate not slow enough to merit data buffering at the device, then the device 130 need not treat the data any differently than conventional data.

Figure 5A:
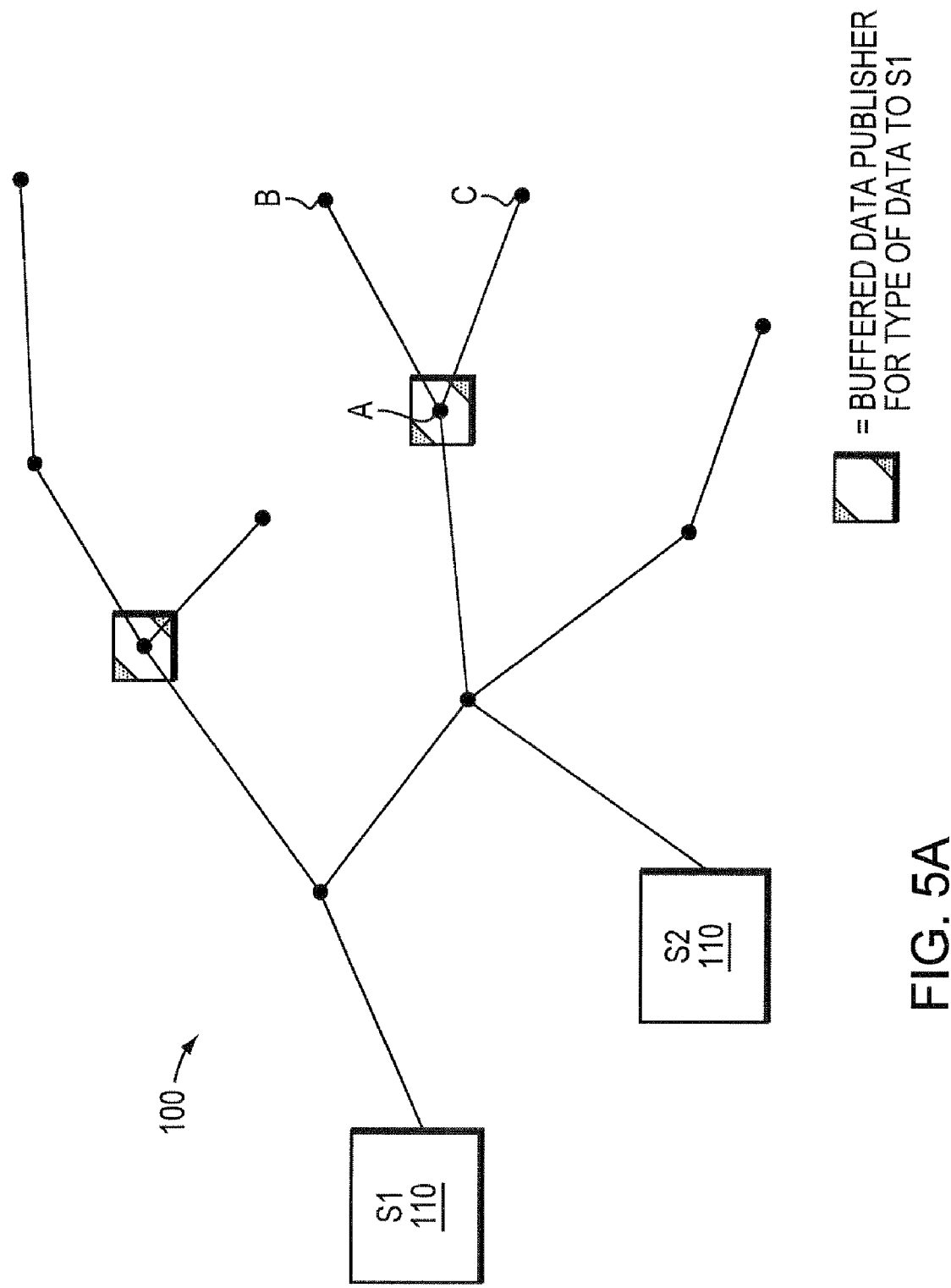
FIGS. 5A and 5B illustrate an example network showing buffered data publishers.

FIG. 5A illustrates a simplified example of buffered data publisher placement for the network 100 shown in FIG. 1. Specifically, as shown, node A has activated its buffered data publishing features (shown with a box), as have other nodes 130 in the network. As an example, assume that nodes A, B, and C each report temperature once every minute (1/min), and that an interested subscriber S1 has requested temperature once every other minute (0.5/min). Nodes B and C will compare their frequency with the requested frequency (0.5/1=0.5), and if that ratio is not less than a configured Alpha (e.g., 0.4), then the nodes simply forward their data toward the interested subscriber without activating their buffered data publishing features. Node A, on the other hand, is generating its own data at 1/min, and is receiving data from node B and node C at 1/min each. Accordingly, node A's receiving data rate is 3/min, and the ratio at node A to the desired frequency is 0.5/3=0.167, clearly less than the configured threshold. As such, node A may activate buffered data publishing, and may buffer the incoming data from itself, node B, and node C, and transmit that data toward the interested subscriber S1 once every other minute, as described above.

Figure 5B:
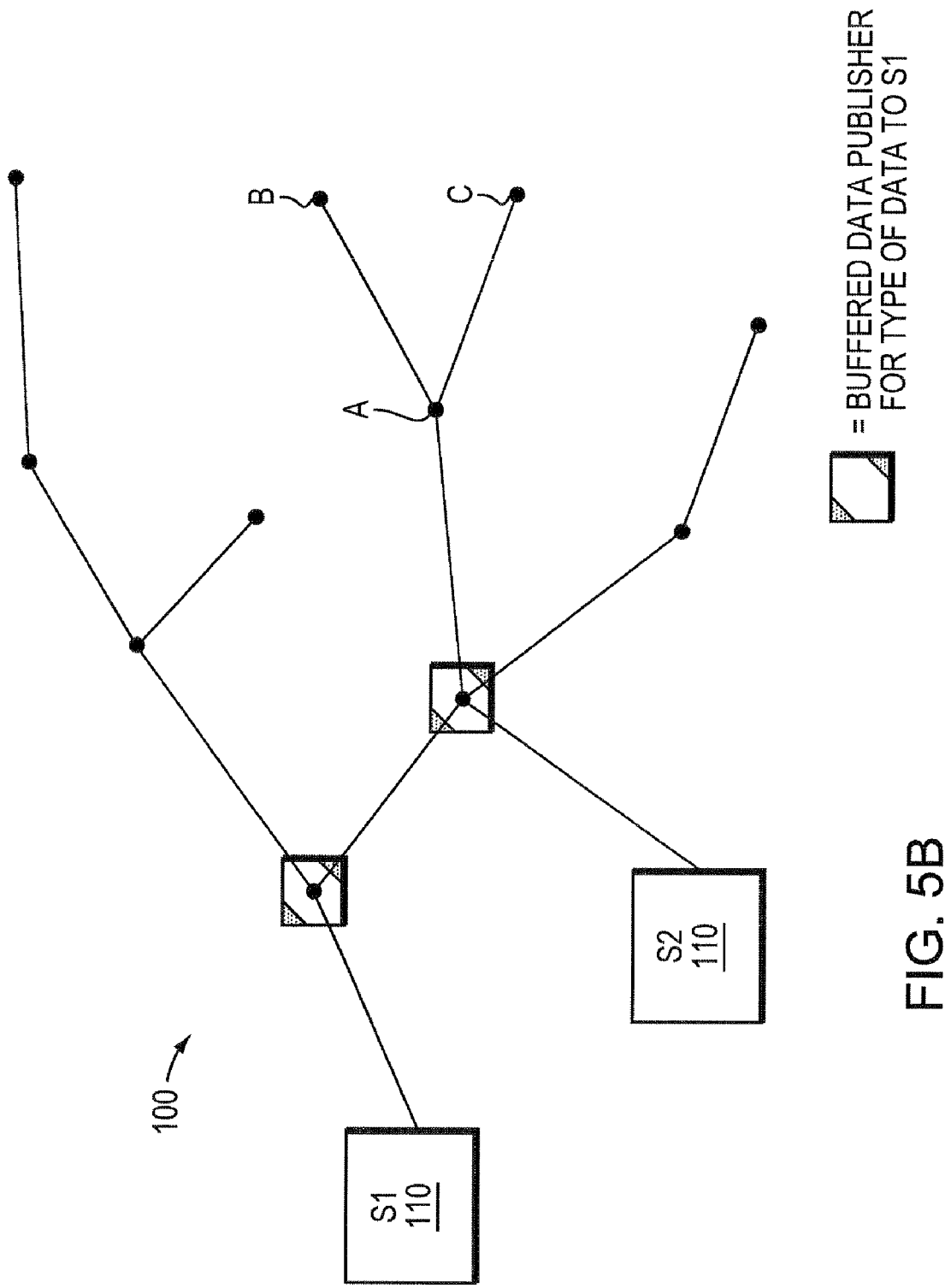

Notably, according to the activation techniques described herein, a general rule of thumb is that when the subscribers 110 do not desire the data very often (i.e., a much lower frequency than the data is being produced), then the buffered data publishing takes place close to the sources of the data, and useless/undesired data transmission through the network is limited. Conversely, if the subscribes request that the data be sent to them at a high rate, such as close to or greater than the rate at which the data is produced, then the buffered data publishing occurs closer to the subscribers. For instance, FIG. 5B illustrates a different arrangement of publishers that may occur if the rate at which the subscriber S1 requests data is substantially higher than that of FIG. 5A. (Those skilled in the art will understand that the representation shown is merely an illustrative example.) For example, if the subscriber wants data three times a minute, then node A need not activate its buffered data publishing functionality, as its ratio would no longer be less than Alpha, but perhaps a node closer to S1 would need to activate its functionality.

In addition, adjusting the configurable threshold Alpha may also correspondingly move the publishing further up or down the network tree between the sensors and the subscriber. As such, the difference between FIG. 5A and FIG. 5B may be caused by adjusting the configured threshold (Alpha). That is, a network administrator may manually adjust the threshold on all publisher-capable nodes in the network, and those nodes will dynamically readjust their functionality based on the techniques described herein to replace the buffered data publishing within the network, accordingly. For instance, by adjusting the Alpha to 0.75, both node B and node C in the example above in FIG. 5A would need to activate buffered data publishing (thus, higher Alpha values create more buffered data publishers, and may therefore be referred to as a "level of activation" or "level of aggregation").

Also, in the event the data rates are changed, such as if the number of reporting devices in the network changes, then the placement of buffered data publishers may also be dynamically change, as described herein. This may also be the case where there is a topology change in the network due to any reason (e.g., radio links, interference, new nodes, failed links, reroutes, etc.). For instance, according to the techniques herein, the publisher location may change dynamically without further configuration.

Moreover, according to the techniques described herein, buffered data publishers may be "stacked" in the network, such that the data received at a buffered data publisher has previously been through a node performing buffered data publishing for the data type being sent to the interested subscriber. For instance, in the example above, it is assumed that the received data at node A is from itself and two non-publisher nodes B and C. However, it may just as well be the case where one or both of nodes B or C have already buffered their respective data. In particular, assume that node B was receiving data faster than the subscriber S1 wanted it, so node B buffered its data before sending it toward S1 at the rate S1 requested. Now, however, node A receives node B's data, as well as node C's and node A's own data. The data received at node A, therefore, will be received at a rate greater than S1's request, since node B's data is already being transmitted at that rate, and now node C's and node A's data are being added to the flow by node A. As such, node A may (if so activated, as described above) buffer all of the data, and send out all of the information (node A's, node B's, and node C's) information at the desired rate to S1. (Those skilled in the art will appreciate that stacked publishers are beneficial for long chains/trees of additive data, such that the data on the way to the publisher is buffered, and re-buffered, until the interested subscriber is reached at roughly the desired frequency.)

Furthermore, the embodiments described herein may be used for multiple sessions with different subscribers requesting the same data, but with multiple frequencies. For instance, the node 130 may determine that there is a plurality of interested subscribers for the data of the particular type, where two or more of the interested subscribers desire the data at different frequencies. So long as one of the frequencies is such that buffered data publishing should be activated on the node, the node may thus transmit the appropriate data (as described above) to each of the interested subscribers at their respective desired frequencies. (Recall that the publishers in the embodiments herein unicast the data toward the subscribers at the desired rate of that subscriber, and are not multicasting all of the data at a single rate as in the conventional publish-subscribe model.)

Figure 6:
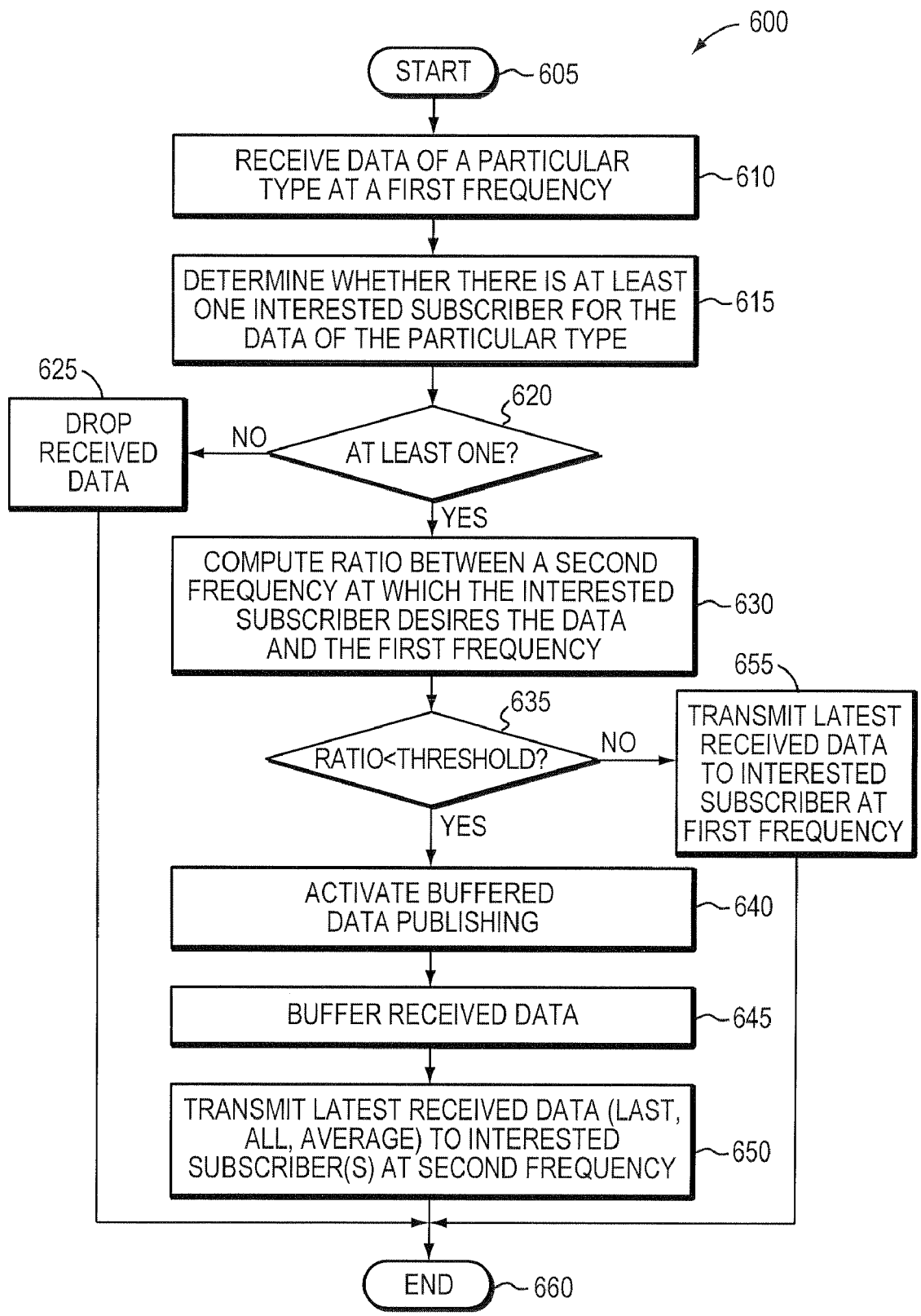
FIG. 6 illustrates an example procedure for dynamically activating buffered data publishing.

FIG. 6 illustrates an example procedure for dynamically activating buffered data publishers in accordance with one or more embodiments described herein. The procedure 600 starts at step 605, and continues to step 610, where a node 130 (e.g., node A) receives data of a particular type at a first frequency, as described above. In particular, the received data may be sensor related data, and may originate at the node in question (node A), and/or from other upstream nodes transmitting their data (e.g., nodes B and C). Then, in step 615, the node may determine whether there is at least one interested subscriber 110 for the data of the particular type, e.g., by performing a lookup operation into subscriber lists 300. If in step 620 there is not at least one interested subscriber, then the node (a capable node) may drop the data in step 625 as there is no interest in the data, and the procedure ends in step 660.

If, on the other hand, in step 620 there is at least one interested subscriber (e.g., S1), then in step 630 the node may compute the ratio between the second frequency at which the interested subscriber desires the data and the first frequency. If this ratio is less than the threshold in step 635 (e.g., F2/F1<Alpha), then buffered data publishing is activated on the node in step 640. As such, through buffered data publishing, the received data may be buffered in step 645 (e.g., into buffers 400), and in step 650, the node may transmit the latest received data (e.g., last, all, average, as mentioned above) to the interested subscriber(s) at the second frequency. Conversely, if there the ratio is not less than the threshold (is greater than or equal to the threshold), then in step 655 the node may simply transmit the latest received data to interested subscriber at the first frequency (i.e., as it is received). The procedure 600 ends in step 660, notably with the inherent ability to continue to receive data, buffer data, change thresholds, change subscriptions, readjust buffered data publishing activity, etc., as described herein and as may be appreciated by those skilled in the art.

Advantageously, the novel techniques described herein dynamically activate buffered data publishers in a sensor network. By configuring devices to activate their buffered data publishing functionality based on interested subscriber frequencies, the novel techniques efficiently determine buffered data publisher locations and publish rates, thus reducing congestion in sensor networks. In particular, dynamically activating buffered data publishing functionality based on sensor data frequency and frequency at which subscriber applications request the data allows local publishers to be dynamically activated at strategic places in the network in order to optimally reduce traffic in the network, which is a major change compared to traditional models of sensor based networks. Also, the dynamic techniques protect the network from mis-configurations (e.g., manual configurations or improper/inefficient dynamic configurations) where the frequency at which the data is sent by the source is out of sync with the required demand. That is, the dynamic aspects of one or more embodiments described herein alleviate the need for cumbersome and inefficient manual configuration.

While there have been shown and described illustrative embodiments that dynamically activate buffered data publishers in a sensor network, it is to be understood that various other adaptations and modifications may be made within the spirit and scope of the present invention. For example, the embodiments have been shown and described herein for use with particular example sensor devices in a sensor network. However, the embodiments of the invention in their broader sense are not so limited, and may, in fact, be used with any similarly arranged network configured with data producing devices, not just sensors. To that effect, the embodiments herein need not be limited to sensor networks, but may be used with any type of network having devices that generate messages at a particular frequency that is different from a frequency at which an interested subscriber may wish to obtain the messages.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   receiving data of a particular type at a first frequency at a node in a computer network;
   determining at the node that there is an interested subscriber for the data of the particular type, the interested subscriber desiring the data at a second frequency;
   computing a ratio between the second frequency at which the interested subscriber desires the data and the first frequency at which the data is received at the node;
   in response to the ratio between the second frequency at which the interested subscriber desires the data and the first frequency at which the data is received at the node being less than a configured threshold, activating buffered data publishing at the node, wherein buffered data publishing comprises:
   buffering the data, and
   transmitting a latest received data to the interested subscriber at the second frequency, wherein the latest received data is a last data received at the node, is all buffered data since a previous transmission, or is a configurable length rolling average of the buffered data; and
   in response to the ratio between the second frequency at which the interested subscriber desires the data and the first frequency at which the data is received at the node not being less than the configured threshold, transmitting the data to the interested subscriber at the first frequency.

2. The method as in claim 1, further comprising:
   determining that there are no interested subscribers in the data of the particular type at the node; and
   in response, dropping the data.

3. The method as in claim 1, wherein the latest received data is the last data received at the node.

4. The method as in claim 1, wherein the latest received data is all buffered data since the previous transmission.

5. The method as in claim 1, wherein the latest received data is the configurable length rolling average of the buffered data.

6. The method as in claim 1, wherein the computer network is a sensor network, the method further comprising:
   receiving the data from a sensor component of the node.

7. The method as in claim 1, further comprising:
   receiving the data from one or more upstream nodes, wherein the buffered data corresponds to data from each of the upstream nodes.

8. The method as in claim 1, further comprising:
   determining that there is a plurality of interested subscribers for the data of the particular type, two or more of the interested subscribers desiring the data at different second frequencies; and
   in response to the ratio between one of the second frequencies at which one of the interested subscribers desires the data and the first frequency at which the data is received at the node being less than the configured threshold, transmitting the latest received data to each interested subscriber at the respective second frequencies.

9. The method as in claim 1, wherein the data has previously been through a node performing buffered data publishing for the interested subscriber for the data of the particular type.

10. The method as in claim 1, wherein the configured threshold is less than 1.

11. The method as in claim 1, further comprising:
    adjusting the configured threshold.

12. The method as in claim 1, wherein transmitting comprises unicasting the data to the interested subscriber.

13. The method as in claim 1, wherein the computer network includes a plurality of nodes that are capable of buffered data publishing, and all buffered data publishing capable nodes in the computer network use the same configured threshold.

14. The method as in claim 1, wherein the computer network includes a plurality of nodes and all the nodes of the computer network are buffered data publishing capable nodes.

15. An apparatus, comprising:
    one or more network interfaces adapted to communicate with nodes in a network;
    a processor coupled to the network interfaces and adapted to execute one or more processes; and
    a memory adapted to store a buffered data publishing process executable by the processor, the buffered data publishing process when executed operable to:

receive data of a particular type at a first frequency;

determine that there is an interested subscriber for the data of the particular type, the interested subscriber desiring the data at a second frequency;

compute a ratio between the second frequency at which the interested subscriber desires the data and the first frequency at which the data is received at the node;

in response to the ratio between the second frequency at which the interested subscriber desires the data and first frequency at which the data is received at the node being less than a configured threshold, activate buffered data publishing, wherein buffered data publishing is configured to:

buffer the data, and transmit a latest received data to the interested subscriber at the second frequency, wherein the latest received data is a last data received at the apparatus, is all buffered data since a previous transmission, or is a configurable length rolling average of the buffered data; and in response to the ratio between the second frequency at which the interested subscriber desires the data and the first frequency at which the data is received at the node not being less than the configured threshold, transmit the data to the interested subscriber at the first frequency.

16. The apparatus as in claim 15, wherein the buffered data publishing process when executed is further operable to:

determine that there are no interested subscribers in the data of the particular type at the node; and in response, drop the data.

17. The apparatus as in claim 15, wherein the buffered data publishing process when executed is further operable to:

determine that there is a plurality of interested subscribers for the data of the particular type, two or more of the interested subscribers desiring the data at different second frequencies; and in response to the ratio between one of the second frequencies which one of the interested subscribers desires the data and the first frequency at which the data is received at the node being less than the configured threshold, transmit the latest received data to the interested subscriber at the respective second frequencies.

18. A non-transitory computer-readable media having software encoded thereon, the software when executed operable to:

receive data of a particular type at a first frequency;

determine that there is an interested subscriber for the data of the particular type, the interested subscriber desiring the data at a second frequency;

compute a ratio between the second frequency at which the interested subscriber desires the data and the first frequency at which the data is received at the node;

in response to a ratio between the second frequency at which the interested subscriber desires the data and first frequency at which the data is received at the node being less than a configured threshold, activate buffered data publishing, wherein buffered data publishing is configured to:

buffer the data, and transmit a latest received data to the interested subscriber at the second frequency, wherein the latest received data is a last data received at the apparatus, is all buffered data since a previous transmission, or is a configurable length rolling average of the buffered data; and in response to the ratio between the second frequency at which the interested subscriber desires the data and the first frequency at which the data is received at the node not being less than the configured threshold, transmit the data to the interested subscriber at the first frequency.

* * * * *